United States Patent [19]
Delp

[11] Patent Number: 6,158,591
[45] Date of Patent: Dec. 12, 2000

[54] METHOD AND APPARATUS FOR EXTRACTING PLANT RESINS

[76] Inventor: Reinhard C. Delp, P.O. Box 123, Laytonville, Calif. 95454

[21] Appl. No.: 09/380,253
[22] PCT Filed: Feb. 24, 1998
[86] PCT No.: PCT/US98/03649
  § 371 Date: Aug. 24, 1999
  § 102(e) Date: Aug. 24, 1999
[87] PCT Pub. No.: WO98/36839
  PCT Pub. Date: Aug. 27, 1998
[51] Int. Cl.[7] .................................................. B03B 7/00
[52] U.S. Cl. .................................. 209/17; 209/18; 209/3; 209/4; 209/5; 209/172; 209/172.5; 209/173
[58] Field of Search ................................ 209/13, 17, 18, 209/3, 4, 5, 172.5, 172, 173

[56] References Cited

U.S. PATENT DOCUMENTS 4,892,938  1/1990  Giovanetto ................................ 536/18.5

*Primary Examiner*—Donald P. Walsh
*Assistant Examiner*—Jonathan R Miller
*Attorney, Agent, or Firm*—Larry D. Johnson

[57] ABSTRACT

An improved method and apparatus for extracting resin from plant material. Conventionally, plant resins, which are useful in many products, are extracted using chemical solvents, which may alter the extract, and may produce a by-product or residue that may be unusable or problematic. The present invention overcomes these drawbacks by using cold water in a wash process to cause the resins to become brittle, while the remaining plant material becomes more flexible. Separation is accomplished using an extractor (10) having a washing chamber (12) with an open top (14) and a screen filter (16) disposed above a settling chamber (18). A collection bottle (24) is placed below a valve (22), and may include a filter (26) to separate resin particles from the solute. The washing chamber is first filled with cold water and then a quantity of plant material (P) is placed therein, followed by an ice layer (30). An agitator (32) is then actuated to mix the contents to separate the resins. The settled resin is thereafter captured by the filter (26) upon opening the valve (22).

3 Claims, 1 Drawing Sheet

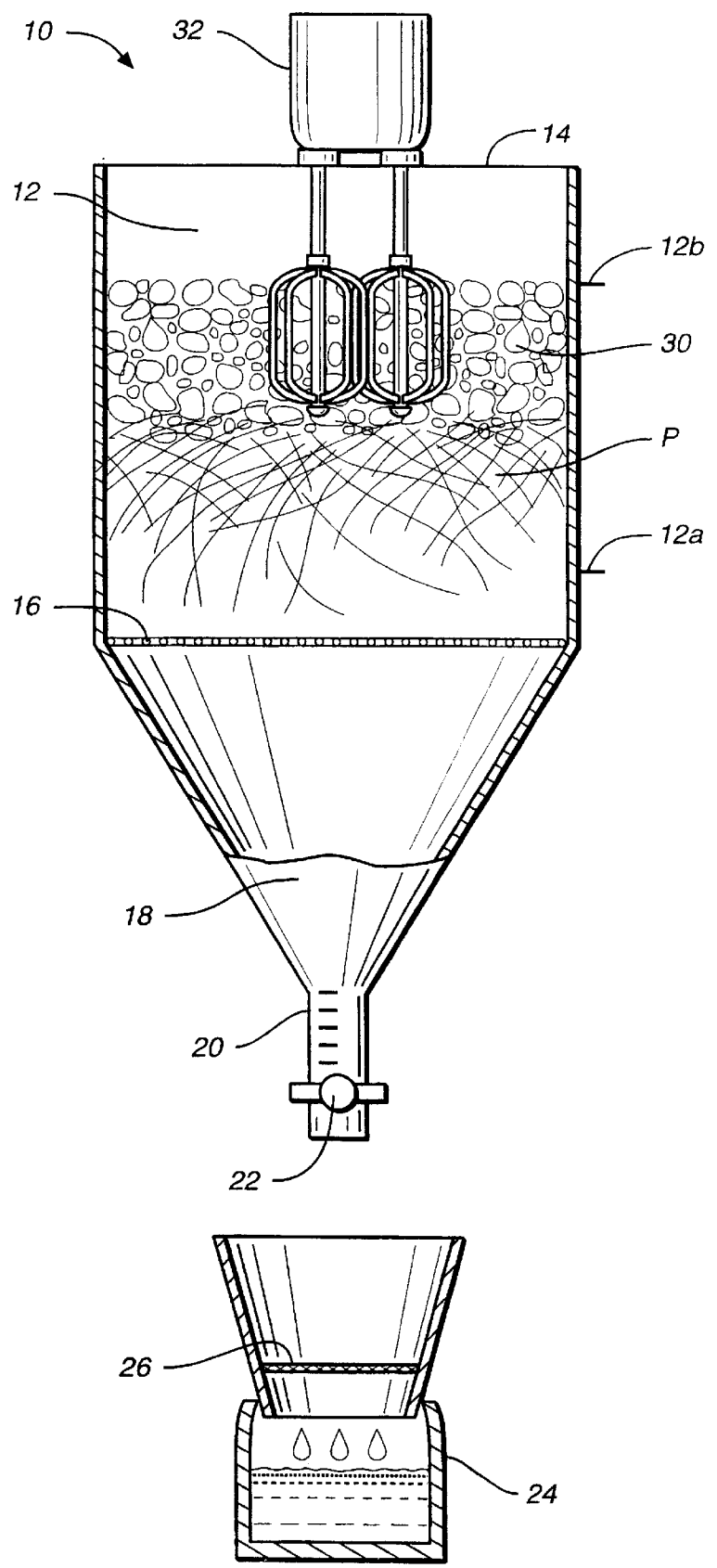
FIG._1

METHOD AND APPARATUS FOR EXTRACTING PLANT RESINS

DESCRIPTION

1. Technical Field

This invention relates generally to the processing of plants and agricultural products, and more specifically to an improved method of extracting resin from plant material.

2. Background Art

Plant resins are used in many products. Extraction of plant resins typically involves the use of chemical solvents, which may alter the extract, and may product a by-product or residue that may be unusable or problematic.

DISCLOSURE OF INVENTION

The invention provides a method and apparatus to extract plant resins from plants (including dried or fresh flowers, leaves, stems, roots, and the like) using only cold water in a wash process. The temperature of the cold water causes the plant resins to become brittle, while the remaining plant material becomes more flexible. Separation is accomplished by agitation, filtering the residual plant matter from the resin particles and solution, and then filtering the resin particles from the solution.

The invention provides an "ice-water" resin extraction method which has several advantages. Other than water there are no solvents necessary, resulting in an unadulterated extract which may be of importance in the use of its fragrant properties or as a food additive. The method produces a very clean product in as little as one step, without further filtration through settling for a specific duration. Small fibrous plant particles take time to saturate and settle, while resins fall out sooner. Pesticide residues are simultaneously removed. The plant material from which the resins are removed stays essentially intact for further processing (e.g., steam or vacuum distillation, solvent extractions, etc.) The water soluble components can be separated from the liquid at different levels. Fresh undried plant material can be processed using this ice-water method.

BRIEF DESCRIPTION OF THE DRAWINGS

FIG. 1 is a side elevation view of an apparatus for extracting plant resins of this invention.

BEST MODE FOR CARRYING OUT THE INVENTION

Apparatus or extractor 10 includes a washing chamber 12 having an open (or openable) top 14, with a screen filter 16 disposed above a funnel-shaped settling chamber 18 having a collection neck 20 and a valve 22. Collection bottle 24 is placed below the valve 22, and may include a filter 26 to separate resin particles from the solute, as described infra.

In use, washing chamber 12 is filled with cold water (e.g. 0°–15° C.) to the level of the initial fill mark 12a. A quantity of plant material P is placed into the cold water, and then ice layer 30 consisting of crushed ice, ice cubes or snow may be placed on top of the plant material until the contents of the washing chamber rises to the level of the maximum fill mark 12b. Agitator 32 (such as an electric mixer with stirring whisks) is actuated to mix the contents, preferably in a sequence of mixing and non-mixing (soaking) intervals, to separate the resins from the plant material, as well as to create a solution of that part of the plant material which is soluble into the cold water. After the agitation is stopped, the resins will continue to settle into the settling chamber. The valve may be periodically opened to allow the resin and solution to pass to the paper filter, capturing the resins and allowing the solution to enter the collection bottle. Alternatively, the collection bottle may be directly connected to the valve, allowing the user to fill the bottle with resin/solute for later separation.

In typical dimensions the apparatus is capable of processing plant material in quantities from several grams to approximately 200 grams (dry weight, depending on the plant species). The development of the extractor was based in part on the result of experiments with resin extraction from the flowers, leafs and stems of the *Navarretia sqarrosa* (Eschs.). It is a member of the Phlox family (Polemoniaceae). It is a small flower (2 to 20 in.) and is well known for its medical properties to native Americans. The resin is visible to the bare eye and is concentrated on the flowers which are protected by sharp spikes and leaves and stems. It develops during early summer when it smells similar to coffee and changes its odor during ripening to "bacon like". Its strong odor makes it of interest to the fragrance industry.

In the washing or separating process, the container (washing chamber) 12 is filled with cold water to the initial fill mark, which is approximately 1.5" above the screen, to avoid direct contact of the plant material with the screen. After the plant material is placed in the water, smaller fibrous plant particles will absorb water and increase in size before reaching the screen. The plant material will also absorb water and become flexible. Stems are cut to a maximum length of approximately 2". The layer of ice cubes, crushed ice, or snow added on top of the plant material causes it to submerge, accelerating the process of water absorption. The ice will drop the temperature of the water and plant material to a point where the resins become brittle and break off of the surfaces of the agitated, flexible plant material. The separated resin particles are heavy and will drop down to the screen, where the light motion created by the "washing" motion above will wash these particles through the screen. In general a washing time from 30 to 60 minutes will separate more than 90% of the resin.

The screen size is related to the plant species being processed. The gaps have to allow the resin particles to penetrate, and are therefore relative to the specific physical properties of the plant material at cold temperature having been submerged in water.

Due to a buffer effect of the screen the liquid in the settling chamber below the screen is relatively still, and increasingly so towards the bottom. The bigger resin particles roll to the collection neck above the valve. Smaller particles may settle on the inclined surfaces of the chamber (e.g., approximately 45 degree angle), and have to be agitated to further descend, or will be washed out with the final drainage of the chamber. In the case of some plant material after about 30 minutes close to half, and after 60 minutes all the resin separated will have settled. The green to brown color of the liquid is due to water soluble plant components where the lighter essential oils and waxes are in the top layer, or due to undissolved fibrous plant particles suspended in the emulsion. After approximately 10 hours, these particles will have absorbed enough water and descend, clearing up the liquid substantially.

A highly fragrant waxy component can be removed from the liquid by injecting cold water, aerated cold water or fine air bubbles under high pressure causing a layer of foam to appear. This foam when separated (skimmed off) settles to a waxy liquid which is stable at room temperature, unlike the total liquids which start decomposing at room temperature after approximately 24 hours. After separating this waxy compound, the remaining solution may be used as an organic fertilizer as is, or concentrated.

The resin is finally removed from the container through the valve on the bottom and collected in a paper filter, which allows the water to drain. At the bottom layer of the liquid the water separates easy through the paper filter, while the higher levels may have a sealing effect on the filter.

All processes used to wash fabric (e.g., the use of a clothes washing machine) are of use in this method (washing forward, reverse, spinning, rinsing, settling/soaking times, etc.) The specific mechanical movement applied depends on the specific characteristics of the resins and plant materials to be processed. A plant specific sequence can be programmed and automated.

The filter size to separate the resin from the plant material is also plant specific. Resin particles when submerged require a slightly larger screen than dry particles due to their physical characteristics in a water emulsion. A sequence of different filter sizes allows further separation.

Any paper filter with pores smaller than the resin crystals and fragments removes the liquid from the resin. The bottom layer of the liquid can be passively removed from the resin (drip). To extract the resin from the total liquid large surface filters and pressure may be needed. In general, any combination of settling and pressure filtration is possible with the ice-water method.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed is:

1. A method of extracting resin from plant material, said method comprising the steps of:

placing a quantity of water having a temperature in the range of 0 degrees to 15 degrees C. into a washing chamber;

placing a quantity of plant material into the water in the washing chamber;

adding a quantity of ice to the quantity of plant material and water in the washing chamber;

mixing the water and plant material to separate resin from the plant material and to create a solution;

filtering the plant material from the resin and solution; and filtering the resin from the solution.

2. An apparatus for extracting resin from plant material, said apparatus comprising a washing chamber having an agitator and an open top, with a screen filter disposed above a settling chamber and valve, with a quantity of water having a temperature in the range of 0 degrees to 15 degrees C. placed in said washing chamber, and a quantity of plant material placed into the water in said washing chamber, so that when the water and plant material in said washing chamber are agitated, resin is separated from the plant material and passes through the screen filter to said settling chamber.

3. The apparatus of claim 2 further including a quantity of ice placed in said washing chamber.

* * * * *